March 29, 1966     L. A. ULMSCHNEIDER     3,243,490
METHOD AND APPARATUS FOR MOLDING IN ONE-PIECE
A SPOOL, WINDING CORE, OR THE LIKE
Original Filed Dec. 30, 1960     3 Sheets-Sheet 1

LAWRENCE A. ULMSCHNEIDER
INVENTOR.

BY R. Frank Smith
Eugene S. Stephens
ATTORNEYS

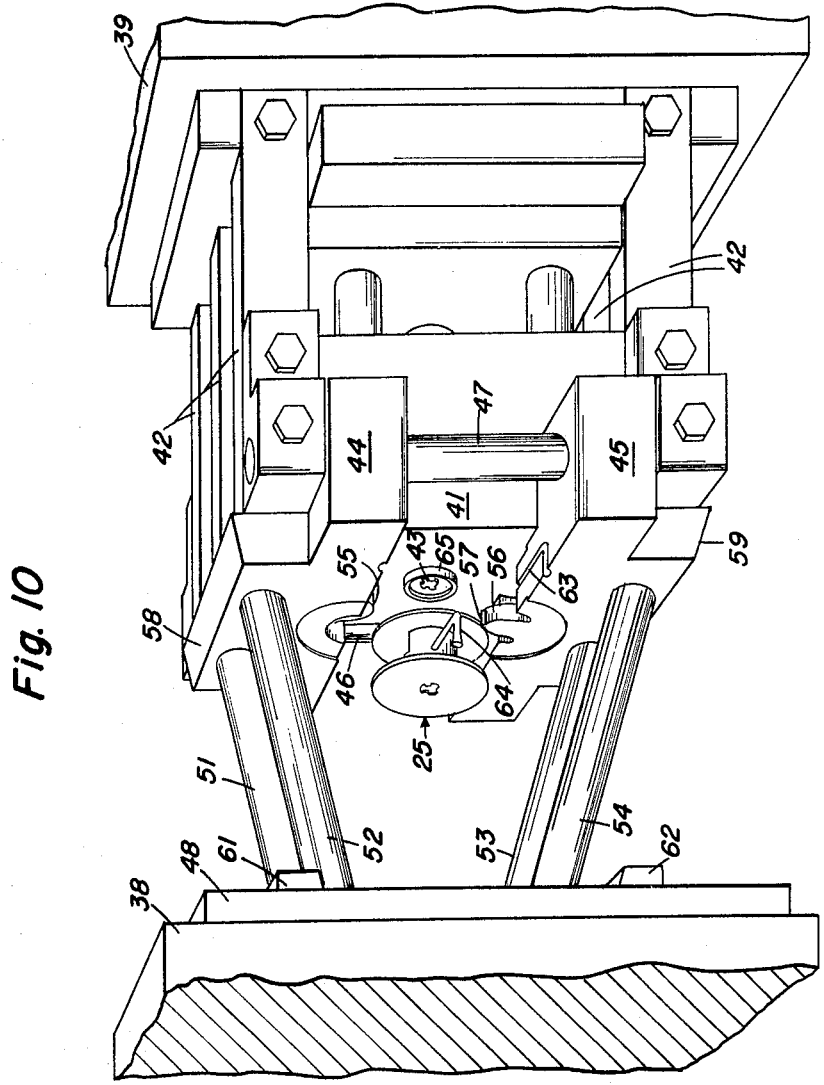

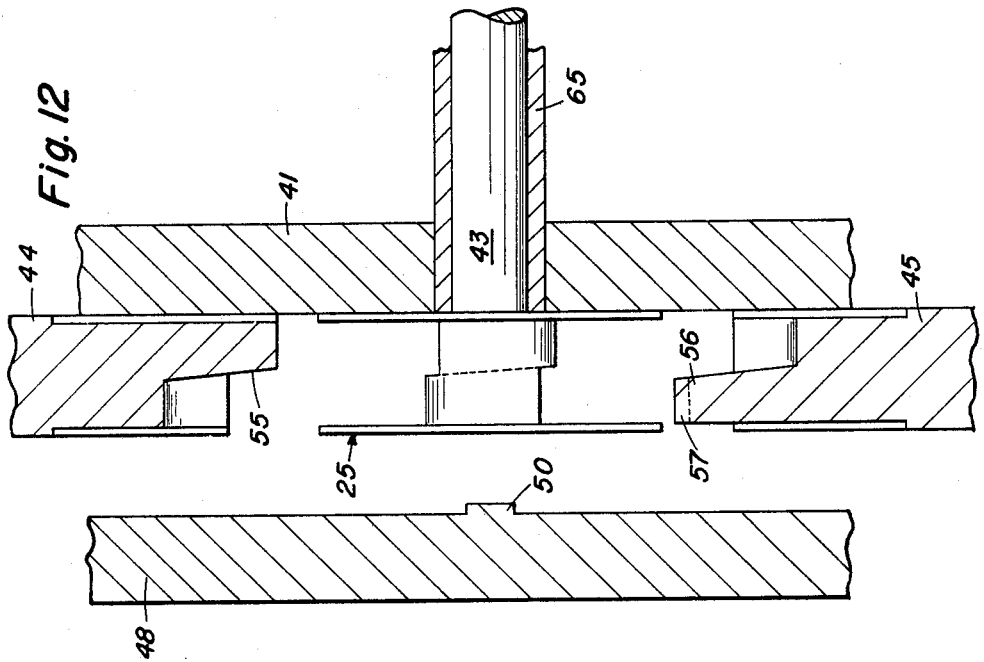
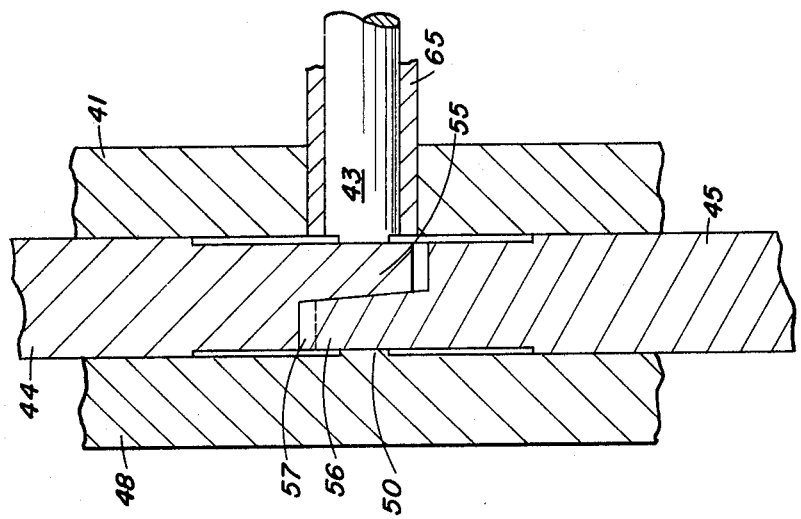
LAWRENCE A. ULMSCHNEIDER
INVENTOR.
BY R. Frank Smith
Eugene S. Stephens
ATTORNEYS

3,243,490
METHOD AND APPARATUS FOR MOLDING IN ONE-PIECE A SPOOL, WINDING CORE, OR THE LIKE
Lawrence A. Ulmschneider, Rochester, N.Y., assignor to Eastman Kodak Company, Rochester, N.Y., a corporation of New Jersey
Original application Dec. 30, 1960, Ser. No. 79,792. Divided and this application Sept. 17, 1962, Ser. No. 224,119
8 Claims. (Cl. 264—328)

This application is a division of my co-pending application Serial No. 79,792 filed December 30, 1960 and since abandoned.

This invention relates to one-piece molded winding core adapted to accommodate a strip of elongated material, to spools comprising such cores with integral flanges formed thereon in the molding operation, and particularly to the method and apparatus for making the same.

In designing a winding core or a spool comprising a flanged winding core, it is rarely possible to reduce the diameter of the core beyond a certain point because of considerations quite independent of the physical strength of the core. Such considerations include the flexibility of the material to be wound, its elastic limit, its tendency to curl, limitations on the rotational speed of the core during winding and unwinding etc. Where such considerations dictate a core of substantial diameter, a solid core construction may obviously be undesirable both from the standpoint of excessive weight and also because of the expense of the material of which the core is formed. Thus, while a common wooden thread spool is fairly practical in spite of its unnecessary bulkiness, the cost of material for a solid plastic spool of exactly the same form would be prohibitive.

One method that has been employed in the past to reduce the bulkiness and cost of molded cores is to provide lightening holes extending axially into the ends of the core in addition to the hole by means of which the core is supported. In molded cores of this type these lightening holes are formed during the molding operation by tapered plugs which are located within the mold cavity during the molding operation and then axially withdrawn from the finished core. While this procedure substantially reduces the amount of material required to produce a core, and thereby the weight and cost of the core, it is not satisfactory for all purposes. One obvious disadvantage is that the ends of such cores are not well adapted to having labelling indicia molded or printed directly thereon, and therefore must be labelled by a more expensive method if such labelling is required. A much more serious disadvantage of this approach is encountered in producing a motion picture film spool of the type in which the ends of the flanged winding core are provided with differently splined center holes, adapted to cooperate with enlarged splined segments on the supporting spindles to insure that the spool will be faced in one direction when mounted on the supply spindle and in the opposite direction when mounted on the takeup spindle as shown in Patent 1,941,522 issued to O. Wittel on January 2, 1934. Such a core must necessarily be provided with an internal cavity large enough to freely accommodate the enlarged splined segment of the supply spindle to allow the core to rotate freely on this spindle when the stationary splined segment is located within the core. In other words, the core must have an internal cavity of sufficient size to include the space defined by the central portion of an imaginary cylinder located within the core between and coaxial with the splined end holes and of greater diameter than the largest cylindrical shaft that can be axially extended through either of the splined end holes. Film spools having cores of this type are presently formed by attaching a flange having a splined center hole to each end of a tubular member. The advantages of molding such a spool or core in a single operation are obvious. The above-described method of providing axial lightening holes in the core cannot, however, be employed to form an internal cavity of this type while still retaining the center supporting holes in the ends of the core because of the requirement that such lightening holes be parallel and in axial relation to the core. Furthermore, it is impossible to form the enlarged internal cavity by means of a solid coring plug removable through the splined supporting hole in one end of the core because that part of the plug that forms the cavity must necessarily be larger than the splined hole through which it would have to be withdrawn. While it might be conceivable to utilize some type of expandable plug which could be collapsed and withdrawn through the splined hole, this approach is entirely impractical because of the necessarily complex structure of such a plug and because of the rigidity required of the plug in order to withstand displacement or deformation under the high pressures to which it is subjected during the molding operation.

According to the present invention, the required internal cavity is provided in the molded core by means of one or more holes extending radially into the core through the cylindrical surface thereof. These holes are formed during the molding operation by solid tapered plugs mounted on portions of the mold movable radially with respect to the core. While this technique does not provide a core having an uninterrupted cylindrical surface, the holes do not destroy the cylindricality of the convolutions of photographic film or other analogous types of web material wound thereon.

One object of the invention provides a method of molding in one operation a light weight hollow winding core.

Another object of the invention is to provide a method of molding a one-piece winding core having a supporting hole in each end thereof and an internal cavity of sufficient size to include the space defined by an imaginary cylinder located within the core between and coaxial with the end holes and of greater diameter than the diameter of the largest cylindrical shaft that can be axially extended through either of the end holes.

Another object of the invention is to provide a method of molding in a single operation a one-piece spool comprising such a winding core having flanges integrally formed at the ends thereof.

Still another object of the invention is to provide apparatus for carrying out said aforementioned method of molding such winding cores or spools in a single molding operation.

These and other objects and features of the invention will be more fully understood from the following detailed description when read in conjunction with the drawings in which:

FIG. 10 is a perspective view of a single cavity mold for producing a spool according to the preferred embodiment of the invention, showing the mold in open position and a finished spool being ejected therefrom;

FIG. 11 is a partial sectional view of the mold in closed position; and

FIG. 12 is a partial sectional view of the mold in open position with a finished spool therein before being ejected therefrom.

Figure 1:
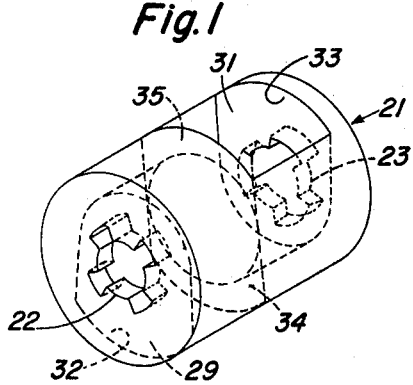
FIG. 1 is an enlarged perspective view of a one-piece molded winding core made in accordance with a preferred embodiment of the present invention and adapted for use in motion picture apparatus and in which the internal cavity is formed by two intersecting radial holes, the internal structure of the core being shown in broken lines.

Referring now to the drawings, FIG. 1 shows a flangeless core 21 adapted to provide a cylindrical support for a roll of web material wound thereon. Due to the structural similarity between the core shown in FIG. 1 and the core embodied in the spool shown in FIGS. 5–9, the elements of the spool core are designated in FIGS. 5–9 by primed numerals corresponding to those numerals shown in FIG. 1.

The core shown in FIG. 1 is provided with differently splined supporting holes 22 and 23 adapted to support the core on the above-mentioned type of splined spindles commonly used in motion-picture apparatus. As previously mentioned, a spool of winding core adapted to be mounted on such spindles must have an enlarged internal cavity. This requirement can best be understood by referring to FIG. 8 which illustrates a supply spindle 24 of this type upon which is mounted a spool 25 comprising a core 21' of substantially the same construction as that shown in FIG. 1 with flanges 26 and 27 integrally molded thereon. In order for the spool to rotate freely about the supply spindle 24, it is obvious that the internal cavity must be large enough to freely accommodate the enlarged splined portion 28 of the spindle.

Referring again now to FIG. 1, the internal cavity within the core is formed by intersecting holes 29 and 31 which extend radially into the core from opposite sides thereof and which communicate with the respective splined holes 22 and 23. Each of the holes presents a substantially rectangular cross section when viewed in a direction radial to the core along the radial center line of the hole, as is most clearly shown in FIG. 5. As used hereinafter with regard to the configuration of the radial holes in the core, a reference to the length of such a hole refers to the distance between the ends of the hole measured parallel to the core axis, and a reference to the width of the hole refers to the distance between the lateral sides of the hole measured perpendicularly to the axis of the core and to the axis of the hole itself. As viewed along the axis of the core, each of the radial holes presents a U-shaped profile with the straight lateral sides of the hole diverging slightly toward the open end. In other words, the profile of each radial hole is provided with a slight amount of draft to facilitate withdrawing the hole-forming dies from the finished core. The semicircular portion of the U-shaped profile is approximately coaxial with the core and is of a greater radius than the major radius of the splined holes in the core ends. In order to effect a maximum reduction in the amount of material required to mold the core, the profile of the holes should be as large as possible without reducing the wall thickness of the core to a point where its rigidity and strength are impaired. The outward ends 32 and 33 of holes 29 and 31 respectively are flat surfaces in planes perpendicular to the axis of the core. While it might be desirable in some instances to provide a slight amount of draft to these surfaces, the flexibility of the ends of the core when these ends are relatively thin makes such draft unnecessary. The inner ends 34 and 35 of the radial holes are flat surfaces in a common plane so disposed that the length of each hole at its open end is greater than its length at its base. The reason for locating the common plane in this manner is a function of the mechanical features of the mold as will be explained later. Since these ends of the holes are in a common plane, it is obvious that the resulting cavity includes a cylindrical space extending between ends 32 and 33 of holes 29 and 31 respectively, coaxial with the core and of the same radius as that of the semi-circular portion of the profile of the radial holes. As previously discussed, and as is readily apparent from FIG. 1, a solid plug of sufficient size to form an internal cavity of the same dimensions could not possibly be withdrawn from the finished spool through either of the splined end holes.

Figure 9:
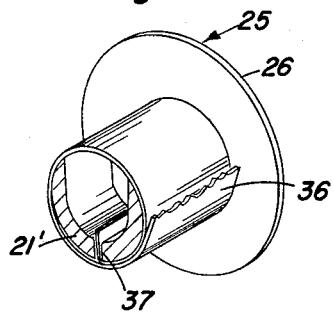
FIG. 9 is a perspective sectional view of a spool according to the preferred embodiment of the invention and showing several convolutions of photographic film or similar material wound thereon.

Although the radial holes 29 and 31 cause discontinuities in the cylindrical surface of the core, a convolution of web material wound thereon will nevertheless retain a cylindrical form if the web comprises a strip of material, such as photographic film, which exhibits the property of being relatively rigid in one direction when flexed in a transverse direction and if the web is cylindrically supported along at least one edge adjacent each radial hole. This ability of photographic film and similar materials to span the discontinuities in the cylindrical surface is illustrated in FIG. 9, which shows a sectional view of the preferred embodiment of the invention comprising spool 25 with a core 21' similar to that shown in FIG. 1, having a convolution of photographic film 36 or similar material wound thereon, one flange of the spool having been removed for illustrative purposes. As is evident from this figure, the cylindricality of the convolution of film is substantially uneffected by the radial holes in the core. If, however, a convolution of some material that does not exhibit this property, such as soft gauze, were wound about the core under any appreciable tension, the convolution would not assume a completely cylindrical form because the gauze would sag into the radial holes in the core. The same effect would likewise occur if strand material such as string were wound upon the core. The usefulness of the core is not necessarily limited to winding materials such as photographic film, however, inasmuch as many applications do not require that the convolutions be absolutely cylindrical. If uniform convolutions are required of a material that will not of itself span the holes in the core, for example strand material or stretchable web material, it is possible to wind such material on the core in uniform convolutions by previously winding onto the core one or more convolutions of some material that will span the holes and then winding the other material thereon. The material initially wound upon the core may, if desired, be glued or otherwise permanently affixed to the core to provide a permanent cylindrical surface adapted for winding all kinds of elongated material. Another alternative would be to provide a resilient metal clip which could be snapped over the core to cover the radial hole or holes. This clip or the material initially wound on the core might also be used to secure the end of the web or strand to be wound thereupon. If uniform convolutions are not required, it is obvious that any kind of elongated material may be wound directly on the core.

Figure 8:
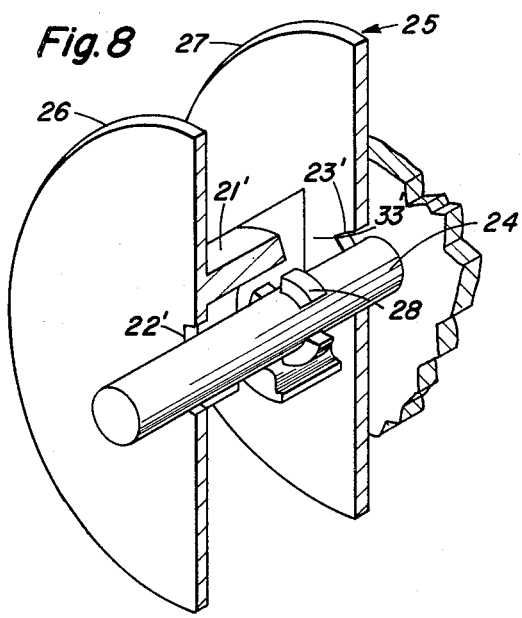
FIG. 8 is an enlarged perspective sectional view of the spool shown in FIGS. 5, 6, and 7 mounted on a spindle of the type employed in motion picture cameras.

Referring again now to the preferred embodiment of the invention, FIGURES 5 through 9 show a spool 25 comprising a core 21' substantially like that shown in FIGURE 1 and previously described, and having radial flanges 26 and 27 integrally molded thereon with the outwardly facing flat surfaces of the flanges co-planar with the ends of the core and with the inwardly facing flat surfaces of the flanges co-planar with the corresponding outward ends 32' and 33' of the radial holes 29' and 31'. The only significant difference between the core of this spool and the core shown in FIG. 1 resides in a narrow slot 37 communicating with the base of one of the radial holes, i.e. 31'. As shown in FIG. 9, this slot provides a means for holding the innermost end of a strip of film as the film is wound onto the spool. The slot could, of course, be in non-linear form to increase the grip on the film or could be provided with a tooth to positively engage a perforation in the film strip. The relation of the spool and its internal structure to a spindle of the type upon which it is adapted to be mounted is shown in FIG. 8, as previously discussed. The illustrated relation of the flanges to the core is only illustrative since the ends of the core could obviously project beyond the flanges or vice versa without departing from the spirit of the invention. Since the inwardly facing surfaces of the flanges of the illustrated spool are co-planar with the corresponding outward ends of the radial holes, it is obvious that the film strip is cylindrically supported adjacent only one end of each hole rather than adjacent both ends as would be the case if a web as wide as the length of the core shown in FIG. 1 were wound on that core. While it might be desirable for some applications to space the outward ends of radial holes in the spool from the inwardly facing surfaces of the corresponding flanges to provide a web supporting surface adjacent both ends of each radial hole, this additional support has proven unnecessary for motion picture film spools because the rigidity of the film enables it to span the radial holes when cylindrically supported adjacent only one end of each hole. Although a film spool having such an additional supporting surface adjacent the flanges could be utilized with the type of spindle shown in FIG. 8, which has the splined portion of the spindle centrally located, such a spool could not be used in all motion picture cameras adapted to use conventional metal spools inasmuch as the enlarged splined portion of the mounting spindle in some of these cameras is so located as to be immediately adjacent the inner surface of the metal flange of the conventional film spool.

Figure 2:
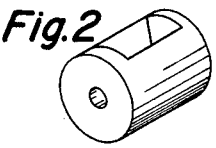
FIG. 2 is a perspective view of an alternative form of a one-piece molded winding core of the type shown in FIG. 1 in which the internal cavity is formed by only one radial hole.
Figure 3:
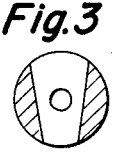
FIG. 3 is a cross sectional view of one embodiment of a core of the type shown in FIG. 2.
Figure 4:
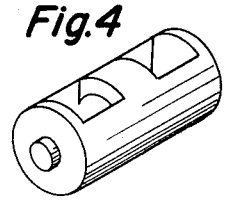
FIG. 4 is a perspective view of still another alternative form of a one piece molded winding core of the type shown in FIG. 1 in which the internal cavity is formed by three intersecting radial holes.
Figure 5:
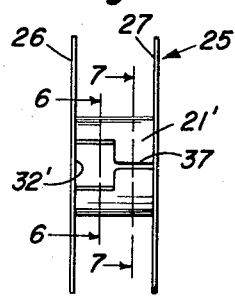
FIG. 5 is a side elevation of a molded one piece flanged spool constructed in accordance with a preferred embodiment of the invention.
Figure 6:
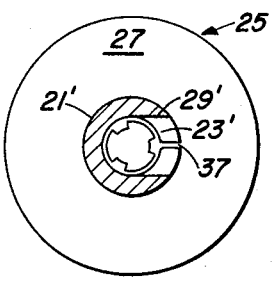
FIG. 6 is a sectional front elevation of the spool taken substantially on the line 6—6 of FIG. 5.
Figure 7:
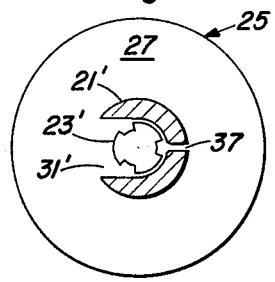
FIG. 7 is a sectional front elevation of the spool taken substantially on the line 7—7 of FIG. 5.

While the foregoing description is directed to a winding core or spool having two intersecting radial holes and specifically adapted for use in motion picture apparatus, it should be understood that the invention is not limited to this type of embodiment. FIG. 2, for example shows a winding core having only a single radial hole and circular end holes adapted to mount the core on a cylindrical shaft. As shown in FIG. 3 the radial hole could extend completely through the core without effecting the utility of the core. FIG. 4, shows another embodiment having three radial holes and having axial supporting pins on the ends thereof to support the core in appropriate trunnions. Obviously, the core may be made in any length and may have any number of radial holes in the core thereof. If the only purpose for which the radial holes are employed is to reduce the mass of the core, the holes need not intersect each other within the core. The exact configuration of the radial holes is not critical so long as they are so shaped as to be capable of being formed by coring members radially removable from the finished core. Holes of the approximate shape and disposition shown in the drawings are generally superior for most applications, however, in that they eliminate a maximum amount of material while still preserving the strength and general cylindrical form of the core. Although the cores described are designated as winding cores, it should be understood that this term does not limit the invention to only those cores upon which successive convolutions of elongated material are to be wound but also encompasses the use of such cores as rollers or guides in winding or feeding apparatus.

FIG. 10 illustrates a single cavity mold for producing a spool according to the preferred embodiment of the invention. The mold is shown mounted between the stationary platen 38 and the movable platen 39 of a conventional injection molding machine in an open position with a finished spool 25 being ejected therefrom.

A movable die plate 41 is rigidly supported on the movable platen 39 by a series of spaced parallel bars 42, and forms the flat surface of the mold cavity that defines the flat end surface of one end of the spool. A four splined arbor 43 is rigidly mounted at the center of the movable die plate to form the splined hole in the corresponding end of the spool. That part of the mold cavity that defines the edge surfaces and the inwardly facing surfaces of the flanges and the internal and cylindrical surfaces of the core is defined by movable cheeker plates 44 and 45. These cheeker plates are slidably mounted on support rods 46 and 47 which fit very accurately in corresponding holes in the cheeker plates and which are rigidly supported on the movable die plate. The stationary die plate 48 is rigidly attached to the stationary platen 38 of the machine and forms that portion of the mold cavity that defines the flat end surface of the other end of the spool. Die plate 48 is provided with a three splined arbor 50, shown in FIGS. 11 and 12, which forms the splined end hole in the corresponding end of the spool.

Also immovably attached to the stationary die plate are four angle pins 51, 52, 53, and 54. Pins 51 and 52 are mutually parallel and pass through angularly disposed holes in cheeker plate 44, and pins 53 and 54 are likewise mutually parallel and pass through similar holes in cheeker plate 45. As viewed from above, each of the pins is aligned with a corresponding space between the movable die plate supporting bars 42. As the movable die plate is moved toward the stationary die plate, the cheeker plates are slide along the angle pins and are moved together due to the angular disposition of the angle pins. Likewise, as the movable die plate is moved away from the stationary die plate the cheeker plates are moved apart to the position illustrated in FIG. 10.

As is evident by references to FIG. 10, the radial holes 29' and 31' in the spool core are formed respectively by coring tongues 55 and 56 on the cheeker plates, tongue 56 being provided with an extension 57 that forms the film slot 37. The relation of the cheeker plates, the die plates, and a molded spool with the mold in open position is shown in cross section in FIG. 12. FIGURE 11 is a view taken along the same plane showing the cheeker plates and die plates in closed relation.

Reference to FIG. 11 makes obvious the fact that a positive intimate contact must be maintained between the adjacent surfaces of the tongues, between the tongues and the splined arbors and between the adjacent surfaces of the cheeker plates and the die plates during the molding operation in order to provide a continous hole through the spool and to prevent flashing along the parting lines of the mold. In order to achieve such intimate contact between the mold components it is essential that these parts be very accurately machined and be held together under great pressure in the closed position. Furthermore, for mass production purposes, it is essential that the accurate surfaces of the mold are not destroyed by wear resulting from rubbing of adjacent portions of the mold during repeated opening and closing cycles. In order to prevent such abrasion between the cheeker plates and the movable die plate, the cheeker plates are spaced from the movable die plate by a paper-thin shim prior to mounting the support rods 46 and 47 in a fixed position on the movable die plate. After the support rods are permanently mounted the shim is removed to leave a very small gap between the face of the movable die plate and the adjacent surfaces of the cheeker plates. As can be visualized by reference to FIGS. 11 and 12, this slight gap likewise allows tongue 55 to clear the end of arbor 43 as the mold is closed. Thus there is no abrasion between the cheeker plates and the movable die plate during the mold closing operation. After the cheeker plates have been brought together by the angle pins, inclined surfaces 58 and 59 on the cheeker plates are engaged by corresponding surfaces of closure bars 61 and 62, shown in FIG. 10, which are rigidly affixed to the stationary die plate 48. As the movable die plate then moves the last few thousandths of an inch, the resilience of the support rods 46 and 47 allows the cheeker plates to be forced into positive intimate contact with the movable die plate by the stationary die plate, and the closure bars force the cheeker plates firmly together by taking up the slight amount of play in the angle pin holes in the cheeker plates. This construction virtually eliminates wear caused by abrasion between the cheeker plates and the die plates. The only remaining mating mold surfaces that tend to wear against each other as the mold is opened and closed are the mating surfaces of tongues 55 and 56. In order to minimize wear between these surfaces the plane of contact between the tongues is sloped so that the tongues do not come into contact unit the final stage of closing the mold.

After the mold has been fully closed as shown in FIG. 11, fluid plastic is injected into the mold cavity through sprue opening 63, shown in FIG. 10, located along the parting plane of the cheeker plates. This sprue communicates with an orifice, not shown, in the stationary die plate.

After the fluid plastic has solidified in the mold to form the finished spool, the mold is opened and the finished spool with the solidified sprue 64 attached thereto is ejected therefrom by means of a stripper sleeve 65, which is shown in ejecting position in FIG. 10. The stripper sleeve is slidably mounted in the movable die plate and is actuated by a mechanical linkage, not shown, to move to its extended position as the mold is opened and to be retracted to a position flush with the flat surface of the movable die plate, as shown in FIG. 11, as the mold is closed.

While the foregoing description is directed to a specific form of single cavity mold, it is obvious that a similar construction could likewise be embodied in a multiple cavity mold. The various embodiments of spools and cores illustrated and described are likewise merely illustrative. Since various modifications may obviously be made within the spirit of the invention, the present disclosure is to be considered as illustrative only and not as limiting the scope of the invention, which is defined by the following claims.

What I claim and desire to secure by Letters Patent of the United States is:

1. A method of molding a one-piece hollow winding core having apertured ends and external surfaces approximately defining a right cylinder comprising: forming a closed cavity having an approximately cylindrical internal surface with a first axial inward projection at one end thereof and a second axial inward projection at the other end thereof and a plurality of coring projections circumferentially and axially offset from adjacent coring projections and axially offset from both of said ends, said coring projections extending radially into said cavity; bringing a first one of said coring projections into a position wherein a portion thereof lies between said axial projections and is in overlapping engagement with the inner end of said first axial projection; bringing a second one of said coring projections into a position wherein a portion thereof lies between said axial projections and is in overlapping engagement with the inner end of said second axial projection; bringing said coring projections into mutually overlapping engagement so as to form a continuous, fluid-excluding configuration extending axially of said cavity and conterminous with and of greater diameter than said axial projections; filling said cavity with fluid molding material; allowing said material to set; radially withdrawing said coring projections from said molded material; and axially withdrawing said axial projections from said molded material.

2. A method of molding in one piece a flanged winding spool having a hollow core with apertured ends and approximately cylindrical external configuration comprising: bringing together first and second coring members to form a closed cavity between two surfaces, said cavity including a pair of axially spaced, aligned, short cylindrical recesses, the outer ends of which are defined by said surfaces, said recesses being of a diameter corresponding to that of the spool flanges desired, and an intermediate generally cylindrical portion extending between said recesses coaxially therewith and of a diameter corresponding to that of the desired spool core, a first one of said surfaces having a first projection axial with respect to said recesses, and a second one of said surface having a second projection axial with respect to said recesses, each of said coring members having respective radial projections mutually offset both circumferentially and axially and extending radially into said cavity and of a width greater than the diameter of said axial projections; bringing both of said coring members into engagement with both of said surfaces; bringing said first and second radial coring projections into mutually overlapping engagement between said axial projections and with said first and second radial projections in overlapping engagement with the inner ends of said first and second axial projections respectively so as to form a continuous, fluid-excluding configuration extending axially of said cavity and conterminous with and of greater diameter than said axial projections; filling said cavity with fluid material; allowing said material to set; radially withdrawing said coring members from said molded material; and axially withdrawing said axial projections from said molded material.

3. A mold for producing one-piece molded core members, said mold comprising: a first die plate; first and second and second cheeker plates adjacent said first die plate, each of said cheeker plates being provided with an arcuate recess; a second die plate; said cheeker plates and one of said die plates being movable between a closed position in which said cheeker plates are in mutual contact and in contact with both of said die plates, in which position the surfaces defining said recesses cooperate with said die plates to define a cavity substantially cylindrical, and an open position in which said cheeker plates are spaced from each other and from said second die plate; a first arbor on said first die plate; a second arbor on said second die plate, said arbors being so disposed as to extend into said cavity in coaxial relation thereto when said mold is in said closed position; a first tongue-like member integral with said first cheeker plate and projecting from said first cheeker plate in the recessed portion thereof; a second tongue-like member integral with said second cheeker plate and projecting from said second cheeker plate in the recessed portion thereof; said tongue-like members extending radially into said cavity from opposed directions in overlapping contacting relation with one another between said arbors with said first tongue-like member in overlapping contact with the inner end of said first arbor and with said second tongue-like member in overlapping contact with the inner end of said second arbor when said mold is in said closed position; when said mold is in said closed position, said tongue-like members being of such configuration as to occupy a space extending axially of said cavity and having a diameter larger than said arbors.

4. A mold according to claim 3 in which the surfaces of said cheeker plates adjacent at least one of said die plates are provided with recesses concentric about and adjoining said arcuate recesses.

5. A mold according to claim 3 wherein, said closed position of said mold, said tongue-like members contact in a plane canted with respect to a plane perpendicular to the axis of said cavity.

6. A mold according to claim 3 wherein, when said mold is closed, coacting surfaces of said die plates and said cheeker plates adjacent at least one end of said cylindrical cavity are so configured as to conjointly form a circular recess coaxial with and of greater diameter than said cavity.

7. A mold for producing one-piece molded core members, said mold comprising:
a first die plate;
first and second cheeker plates adjacent said first die plate, each of said cheeker plates being provided with an arcuate recess;
a second die plate;
said cheeker plates and one of said die plates being relatively movable between a closed position in which said cheeker plates are in mutual contact and in contact with both of said die plates, in which position the surfaces defining said recesses cooperate with said die plates to define a cavity substantially cylindrical, and an open position in which said cheeker plates are spaced from each other and from said second die plate;
a first arbor on said first die plate;
a second arbor on said second die plate;
said arbors being so disposed as to extend into said cavity in coaxial relation thereto when said mold is in said closed position;
a plurality of tongue-like members including at least a first tongue-like member integral with said first cheeker plate and projecting from said first cheeker plate in the recessed portion thereof, and a second tongue-like member integral with said second cheeker plate and projecting from said second cheeker plate in the recessed portion thereof;
said tongue-like members extending into said cavity from opposed directions in overlapping contacting relation with one another between said arbors and with at least one of said tongue-like members in overlapping contact with the inner end of each of said arbors when said mold is in said closed position; said tongue-like members being of such configuration that, when said mold is in said closed position, they coinjointly occupy a space extending axially of said cavity and having a diameter larger than said arbors.

8. A method of molding a one-piece hollow winding core having apertured ends and external surfaces approximately defining a right cylinder comprising:
forming a closed cavity having an approximately cylindrical internal surface with a first axial inward projection at one end thereof and a second axial inward projection at the other end thereof, and a plurality of lateral coring projections, adjacent ones of which extend into said cavity from opposite sides of a plane containing the axis of said axial projections;
bringing said lateral coring projections into mutually overlapping engagement with one another and with the inner ends of said axial projections to conjointly form a continuous fluid-excluding configuration extending axially of said cavity and conterminous with and of greater diameter than said axial projections;
filling said cavity with fluid molding material;
allowing said material to set;
laterally withdrawing said lateral coring projections from said molded material; and
axially withdrawing said axial projections from said molded material.

References Cited by the Examiner

UNITED STATES PATENTS

| 2,400,024 | 5/1946 | Roehrl | 264—318 |
| 2,487,359 | 11/1949 | Natzler. | |
| 2,783,502 | 3/1951 | Alplanalp. | |
| 2,771,849 | 11/1956 | Galbreath. | |
| 2,994,921 | 8/1961 | Hultgreen. | |
| 3,105,655 | 10/1963 | Park et al. | 264—328 XR |

ROBERT F. WHITE, *Primary Examiner.*

ALEXANDER H. BRODMERKEL, *Examiner.*

J. R. DUNCAN, R. B. MOFFITT, *Assistant Examiners.*